United States Patent

[11] 3,612,272

| [72] | Inventors | Samuel S. Aidlin<br>214 Beaumont St.;<br>Stephen H. Aidlin, 3855 Shore Parkway,<br>both of Brooklyn, N.Y. 11235 |
|---|---|---|
| [21] | Appl. No. | 17,665 |
| [22] | Filed | Mar. 9, 1970 |
| [45] | Patented | Oct. 12, 1971 |

[54] SEPARATOR-CONVEYOR
10 Claims, 6 Drawing Figs.

| [52] | U.S. Cl. | 209/92,<br>209/102 |
|---|---|---|
| [51] | Int. Cl. | B07b 13/04 |
| [50] | Field of Search | 209/102,<br>84, 92, 100 |

[56] References Cited
UNITED STATES PATENTS

| 1,559,916 | 11/1925 | Royer | 209/92 |
| 2,116,006 | 5/1938 | Thys | 209/92 |

*Primary Examiner*—Richard A. Schacher
*Attorney*—Victor M. Helfand

ABSTRACT: A separator-conveyor for the products of molding or casting or like apparatus, including the produced articles and the associated scrap, in which one of the two items is of larger size than the other, consisting of an endless conveyor belt mounted below the outlet of the molding apparatus, and provided with a continuous row of transversely disposed cleats along its center; spaced a distance sufficient to accommodate between them the smaller of the two items but insufficient to accommodate the larger of the items; the latter resting on top of the cleats. Guards are provided for retaining the items between the cleats and the items on top of the cleats in position while moved by the conveyor belt.

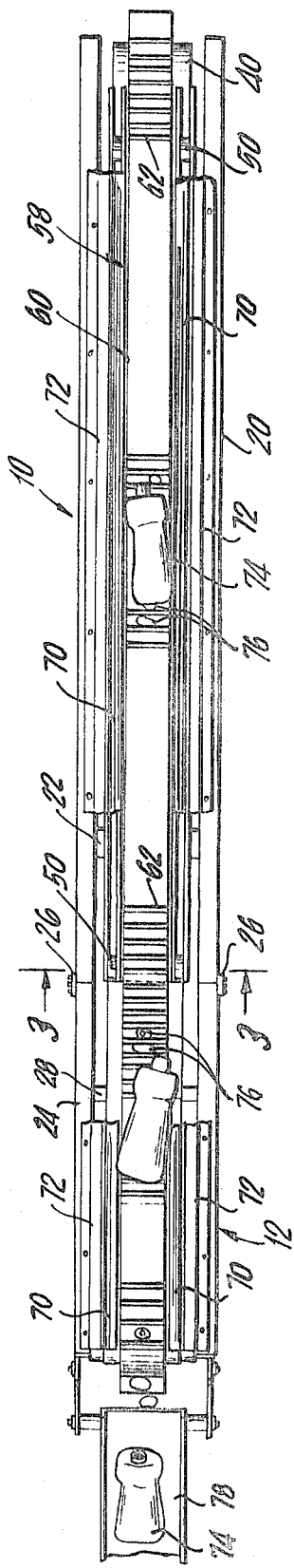
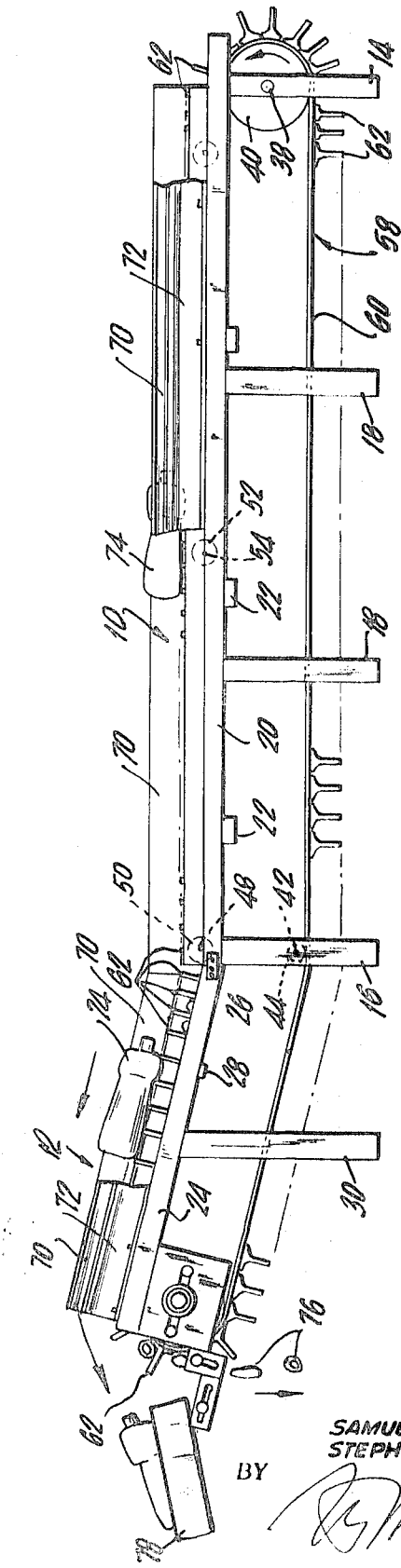

SEPARATOR-CONVEYOR

The present invention relates to an auxiliary apparatus for use with apparatus for molding thermoplastic articles and is directed to the provision of such auxiliary apparatus that will receive from the molding apparatus the molded articles together with associated scrap material deriving from the trimming and separation of such articles, and will convey both, the articles and the scrap, to separate destinations.

The scrap deriving from the molding of thermoplastic articles varies with different types of molding. Thus, the scrap formed with blow-molding apparatus consists of the "flash" produced between the mold section which is trimmed away from the molded article. In this type of molding, the scrap is, generally, of relatively lesser size or bulk than the molded article. However, in the case of injection molding with a multiple cavity mold, the reverse is true. The scrap is in the form of a sprue or gate to which the articles from the several mold cavities are attached is generally of greater dimension or size than the molded articles.

The present invention is directed to automatic separating and conveying apparatus which may be used in connection with both of the above types of molding apparatus, in each instance capable of separating the scrap items from the molded items and conveying them to different destinations.

It is an object of the present invention to provide automatic separating and conveying apparatus, of the character described, that will operate at high rates of speed, to conform with the speed of delivery from the molding apparatus.

It is another object of the present invention to provide apparatus, of the character described, which is accurate and effective for its purpose.

It is still another object of the present invention to provide apparatus, of the character described, which is of relatively simple construction and relatively economical to produce and maintain, and which is relatively compact and occupies a minimum of floorspace, and which may be moved about from one molding apparatus to another.

The foregoing and other objects and advantages of the automatic separating and conveying apparatus of the present invention for the products of molding apparatus will become clear from the embodiment thereof shown in the accompanying drawing and from the description following, both of which being intended as illustrative and not as limiting the invention to the specific claims therein shown and described. In the drawings:

FIG. 1 is a top plan view of one embodiment of a separator-conveyor of the present invention, as adapted for use with blow-molded articles having scrap of lesser size than the molded articles;

FIG. 2 is a side elevation of the same;

Figure 3:
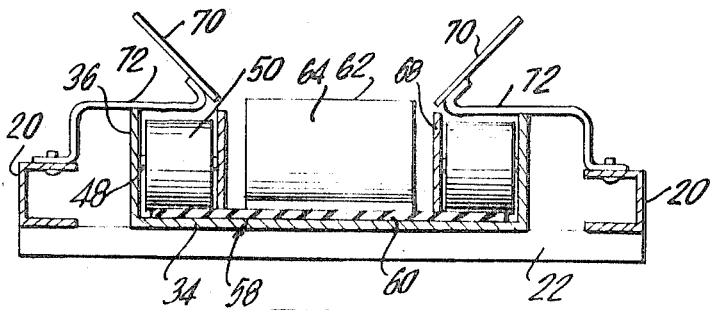
FIG. 3 is a section taken on line 3—3 of FIG. 1.
Figure 4:
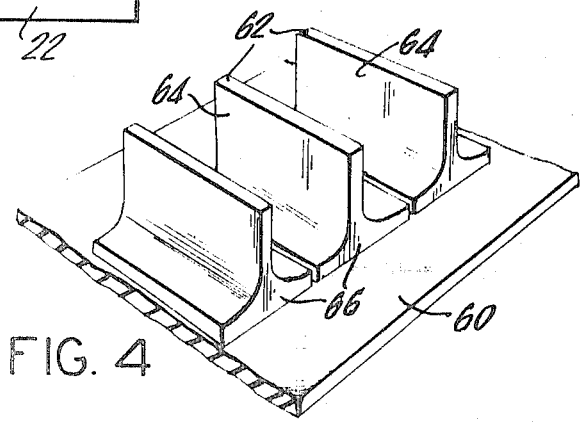
FIG. 4 is a fragmentary, isometric view of the conveyor belt of the present invention.

Generally stated, the separator-conveyor of the present invention is intended for use with molding apparatus, either injection or blow-molding, in which the molded articles are separated from their scrap, such as flash or sprues, before being ejected from the apparatus, and resides in the provision of a conveyor having a belt provided with upstanding spaced cleats which are spaced apart a distance less then the larger of the objects discharged from the molding apparatus, but less than the dimension of the smaller objects discharged from the molding apparatus, whereby the smaller of the objects falls between the cleats of the conveyor belt and the larger of the articles reposes on their upper edges. By this arrangement the objects between the cleats are discharged at a point closer to the conveyor belt proper, into one receiving means, and the articles on the top of the cleats at another point further from the conveyor belt proper, to another receiving means.

Referring now more specifically to the embodiment of the invention illustrated in the drawing, the same is shown to comprise a supporting frame, including a horizontally disposed frame section, generally designated as 10, and a diagonally, upwardly extending frame section extending from one end of frame section 10 and generally designated as 12. Frame section 10 comprises two spaced rows s of spaced posts, including end posts, 14 and 16, and intermediate posts, 18. Each row of posts 16 and 18 supports at its upper ends longitudinal bars, 20, which may comprise channel members. BArs 20 may be interconnected by a number of transverse bars, 22. Section 12 comprises longitudinally extending spaced bars, 24, each connected by one end to a bar 20, as at 26, in outwardly, upwardly directed direction relative thereto. BArs 24 may be interconnected by transverse bar, 28, and may be additionally supported by uprights, 30.

Transverse bar 22 supports a channel member, generally designated as 32, extending the length of frame section 10. Channel member 32 is of substantially rectangular cross section, and includes a bottom wall, 34, resting on transverse bar 22, and upright walls, 36.

Uprights 16 at the free end of the frame section 10 support between them, at a midpoint, an axle, 38, on which is journaled a drum, 40. Axle 38 is so positioned and drum 40 is of such diameter that the upper end of the latter is substantially on a level with the bottom wall 34 of channel member 32. Uprights 16 at the other end of frame section 10 each supports, at a midpoint, a pin, 42, on which is mounted a roller, 44, whose bottom edge is on a level substantially with the lowermost point of the drum 40. Bars 24 of frame section 12 support, at their free ends, a second rotatable drum, 46.

Each of walls 36 of channel member 32 supports, at its inner end, an inwardly extending pin, 48, overhanging the channel, on which is mounted a roller, 50, in slightly spaced relation to the bottom wall 34 of channel member 32. Additional roller, 52, may be mounted on pins 54 set into walls 36, intermediate their ends, extending over channel member 32, on a level with rollers 50.

An endless conveyor belt, generally designated as 58, is mounted over drums 40 and 46, and is passed under upper rollers 50 and 52 and under lower roller 44. Conveyor belt 58 comprises a web, 60, which is of a width substantially equal to the width of channel member 32 within which it fits, immediately adjacent its bottom 34, and is provided along its entire length with transversely disposed, regularly spaced, upstanding cleats, 62, on its outer surface; the cleats defining spaces, 64, between them. Cleats 62 are of lesser width than web 60 and are arranged in a row along the center of the web to leave the marginal edge portions of the web that move freely under the rollers 50 and 52 that serve to retain the belt in position; roller 50 also serving as pivots for shifting the direction of the belt as it moves from horizontal frame section 10 to diagonal frame section 12.

While cleats 62 may be integrally formed with web 60, it is preferable to have them formed in T-shape and secured, in inverted position, by their crossbars, 66, to web 60. Cleats 62 may be of a width and height not less than the width and height of the lesser or smaller products dropping on to the belt from a molding apparatus, to receive such smaller products between them; and are spaced apart a distance to prevent the dropping between them of the larger of the products dropped onto the belt from a molding apparatus.

Means are provided for preventing the smaller products from dropping out laterally from spaces 64. Such means may comprise longitudinally extending guardplates, 68, that may be supported, in vertical position, on the roller-supporting pins 48 and 54 of each channel member wall 36, in close proximity to side edges of the cleats 62, with their lower edges close to web 60. These guardplates 68 may be, if desired, extended over frame section 12 and supported thereon in any desired manner.

Means are also provided for retaining the larger of the products discharged from a molding apparatus on top of the cleats 62, against dropping laterally off them. Such means may comprise longitudinally extending guardplates, 70, supported, on edge, one each side of cleats 62 and extending upwardly from a point adjacent their upper corners, to form a troughlike or channel arrangement, with the cleat tops forming the bottom of the channel. The guardplates 70 may be supported in any desired manner, as by offset ends of brackets, 72, secured by their other ends on bars 20. Preferably, guardplates 70 may be disposed in upwardly divergent relation, to provide a channellike arrangement which is wider at the top to ensure that the molded products, both large and small, discharged from molding apparatus, fall onto the cleats or between them. Guardplates 70 may likewise be extended to overlie frame section 12.

It may here be stated that either of drums 40 and 46 may be the driving or driven drums for the endless conveyor belt 58, by being operatively connected to a motor, in any suitable manner, not thought necessary to be specifically illustrated.

In operation, the apparatus of the invention may be disposed with the free end of its horizontal section 10 below the discharge opening of a molding apparatus; such opening being disposed above the space between guardplates 70; and the endless conveyor belt 58 set in motion with its upper portion to move in the direction of the other or discharge end of the conveyor. FIGS. 1 and 2 show the conveyor as used with a molding apparatus, such as a blow-molding apparatus, in which the larger product is in the form of a bottle, 74, and the small product in the form of the flash, 76, trimmed from the bottle. Flash 76, being smaller than the space 64, falls between cleats 62 into such space, and the bottle 74, which is larger than the space 64, between cleats 62, rides on top of the cleats. As the smaller of the products, flash 76, reaches the other end of the conveyor, it drops out from between the cleats, in closer proximity to belt web 60, to be received in a suitable receptacle, while the larger of the products; namely, the bottle 74, is moved by the cleat tops to be dropped off the conveyor at a more remote point from the web 60, where it may be received, for instance, by a second conveyor, 78, for movement to a specific destination.

Figure 5:
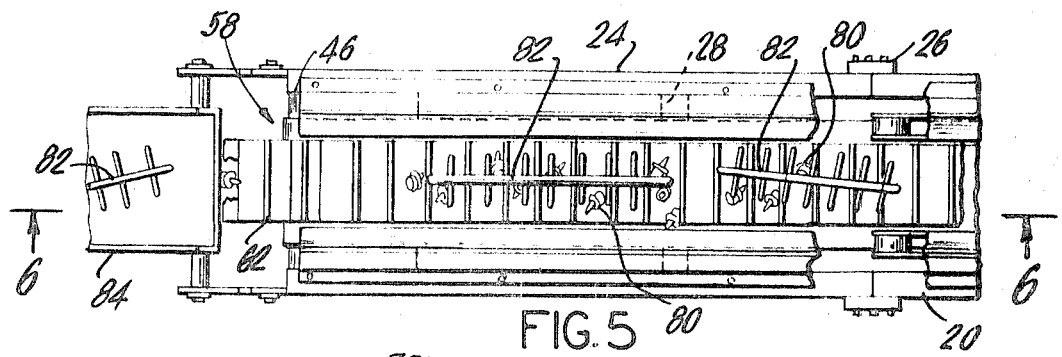
FIG. 5 is a fragmentary, top plan view showing the elevated end of the discharge end of the separator-conveyor of the invention, as adapted for use with injection molded articles, where the articles are of lesser size than the sprue or ladder scraps which connect them in the mold.
Figure 6:
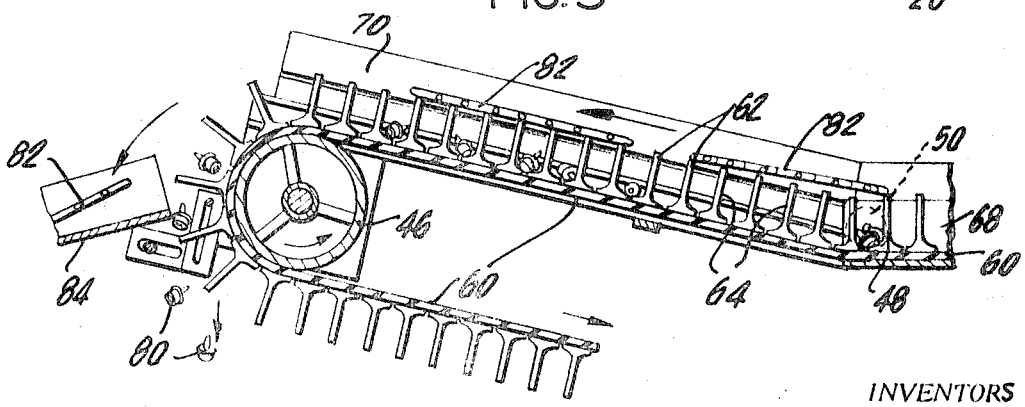
FIG. 6 is a fragmentary, sectional view through the apparatus of FIG. 5, taken on line 6—6 thereof.

FIGS. 5 and 6 illustrate the use of the separator-conveyor of the invention for the products of injection molding apparatus, wherein the molded article, 80, is the smaller of the two products and drops into the space 64 between cleats 62, and the sprue or gate, 82, which is the larger of the two molded products, stays on top of the cleats 62. In this instance, the molded articles 80 drops off the conveyor belt at a point closer to web 60 thereof, whereas the sprue 82 will drop off the ends of the cleats 62 at the point more remote from web 60, as into a chute, 84.

It is to be understood that while the present invention has been described and discussed in connection with separating and conveying products discharged from molding apparatus, with the molded article separated from its scrap, the apparatus of the invention may be used as well for the separating and conveying of separated articles and scrap from diecasting apparatus and, as a matter of fact, for separating and conveying any two items of appreciably different sizes discharged from any common source.

It may here be stated that the two-level construction of the embodiment of the separator-conveyor illustrated in the drawings; namely, sections 10 and 12, is designed for use with molding apparatus whose outlet for its products is disposed at a low level, to provide space at the discharge end of the conveyor for the disposal or receptacles or auxiliary apparatus for receiving the conveyed material. It will be understood, therefore, that in the proper circumstances, as where the molding apparatus is sufficiently raised, the separator-conveyor of the invention need not have its discharge end at a raised level, but may be horizontal along its entire length.

This completes the description of the separator-conveyor of the present invention for the articles and waste material produces by molding or like apparatus. It will be readily apparent that such separator-conveyor is completely automatic and will effectively operate with a minimum of care and attention; that it is compact and relatively lightweight, and may be readily moved from molding apparatus to molding apparatus, or for storage. It will likewise be apparent that the apparatus of the invention may, if desired, be used, within limits, for conveying the products of both, blow-molding and injection apparatus, without any alteration.

It will be further apparent that numerous variations and modifications may be made in the separator-conveyor of the present invention by anyone skilled in the art, in accordance with the principles of the invention hereinabove set forth, without the exercise of any inventive ingenuity.

What we claim is:

1. A separator-conveyor for products discharged from molding or like apparatus, said products including a formed article and the scrap associated with said article and broken away therefrom; one of said products being of greater size than the other; said apparatus including an endless conveyor belt and means for supporting the same for continuous movement, said belt including an endless web and a continuous row of upstanding, substantially flat cleats disposed tranversely on the outer surface of said belt, said cleats evenly spaced from one another a distance to accommodate the smaller of the products of a molding apparatus and insufficient to accommodate the larger of said products between them; whereby said smaller products dropped on said conveyor belt from a molding apparatus fall into the spaces between said cleats, and the larger of said products rest on the edges of said cleats; said smaller and said larger products being thereby discharged from said belt at different distances from said web.

2. The separator-conveyor of claim 1, wherein said cleats are of substantially rectangular cross section.

3. The separator-conveyor of claim 2, wherein said supporting and moving means include an elongated frame, said frame having rotatably supported drums at its ends wherearound said endless conveyor belt is mounted for movement, said web being of greater width that said cleats, leaving marginal edge portions of said web to each side of said row of cleats, and wherein means are provided on said frame for engaging said marginal edge portions to retain said conveyor belt in place as it moves across the upper level of said separator-conveyor.

4. The separator-conveyor of claim 3, wherein means are provided along each side of side row of cleats for retaining in place between said cleats products dropped thereinto, as said cleats move along the upper level of said conveyor belt.

5. The separator-conveyor of claim 3, wherein means are provided for guiding products discharged from a molding apparatus onto the row of cleats, as said cleats move along the upper level of said conveyor belt.

6. The separator-conveyor of claim 3, wherein said means for retaining said conveyor belt as it moves across the upper level of said separator-conveyor includes a channel member having a bottom wall of a width substantially equal to the width of said web, said web supported on said bottom wall, and upstanding sidewalls at each side edge of said bottom wall, and rollers mounted on each said sidewall and above said marginal edge portions of said web, to inhibit displacement of said web from said bottom wall.

7. The separator-conveyor of claim 6, wherein said means supporting said conveyor belt comprise a frame including upright and horizontal bars, said channel member supported from said horizontal bars, said channel member supported from said horizontal bars, said frame having a drum rotatably supported at each end thereof, said endless conveyor belt mounted over said drums for rotation thereby.

8. The separator-conveyor of claim 7, wherein said frame includes a horizontal portion and a second portion disposed at an upwardly outwardly extending angle to said horizontal portion, one of said drums disposed at the free end of said second frame portion, and wherein roller means are provided on said frame at the end of the horizontal portion thereof for engaging over the upper and lower levels of said conveyor belt, said rollers forming pivots for said conveyor belt level for directing the same from horizontal level towards said one drum.

9. The separator-conveyor of claim 3, wherein means are provided for guiding products discharged from a molding apparatus to said cleats, said means comprising a guide wall rising above said cleats as they move along the upper level of said conveyor belt adjacent the upper corners of said cleats.

10. The separator-conveyor of claim 9, wherein said guide walls diverge upwardly.